US012633272B2

(12) United States Patent
Alleysson

(10) Patent No.: US 12,633,272 B2
(45) Date of Patent: May 19, 2026

(54) METHOD FOR CONVERTING DATA BETWEEN COLOUR SPACES

(71) Applicants:CENTRE NATIONAL DE LA RECHERCHE SCIENTIFIQUE, Paris (FR); UNIVERSITE GRENOBLE ALPES, Saint Martin d'Heres (FR); UNIVERSITE SAVOIE MONT BLANC, Chambery (FR)

(72) Inventor: David Alleysson, Moirans (FR)

(73) Assignees: CENTRE NATIONAL DE LA RECHERCHE SCIENTIFIQUE, Paris (FR); UNIVERSITE GRENOBLE ALPES, Saint Martin d'Heres (FR); UNIVERSITE SAVOIE MONT BLANC, Chambery (FR)

( * ) Notice: Subject to any disclaimer, the term of this patent is extended or adjusted under 35 U.S.C. 154(b) by 133 days.

(21) Appl. No.: 18/574,917

(22) PCT Filed: Jun. 29, 2022

(86) PCT No.: PCT/EP2022/067910
§ 371 (c)(1),
(2) Date: Dec. 28, 2023

(87) PCT Pub. No.: WO2023/275150
PCT Pub. Date: Jan. 5, 2023

(65) Prior Publication Data
US 2024/0304161 A1 Sep. 12, 2024

(30) Foreign Application Priority Data
Jun. 30, 2021 (FR) ...................................... 2107117

(51) Int. Cl.
*G09G 5/02* (2006.01)
*G01J 3/28* (2006.01)
(Continued)

(52) U.S. Cl.
CPC .................. *G09G 5/02* (2013.01); *G01J 3/28* (2013.01); *H04N 17/002* (2013.01); (Continued)

(58) Field of Classification Search
None
See application file for complete search history.

(56) References Cited

U.S. PATENT DOCUMENTS

2001/0038459 A1* 11/2001 Mahy ................... H04N 1/6033
358/1.9
2003/0176281 A1* 9/2003 Hultgren ............. H04N 1/6058
503/204
(Continued)

FOREIGN PATENT DOCUMENTS

FR 3085519 A1 3/2020
WO 2020/048701 A1 3/2020

OTHER PUBLICATIONS

International Search Report issued on Sep. 8, 2022, in corresponding International Application No. PCT/EP2022/067910, 4 pages.
(Continued)

*Primary Examiner* — Jason A Pringle-Parker
(74) *Attorney, Agent, or Firm* — Maier & Maier, PLLC

(57) ABSTRACT

A method for converting an initial datum between a colour space of a first colorimetric system and a colour space of a second colorimetric system, the initial datum being formed of at least one element expressed in a colorimetric reference system, the method includes: converting the initial datum into a projected datum, by expressing the at least one element in the colour space of the first colorimetric system; adapting the projected datum into an adapted datum, by expressing the at least one element in the colour space of the second colorimetric system. The colour space of the first colorimetric system and of the second colorimetric system
(Continued)

are each a hyperbolic space defined by a hyperbolic metric projective reference system.

21 Claims, 8 Drawing Sheets

(51) Int. Cl.
*H04N 17/00*          (2006.01)
*H04N 23/85*          (2023.01)
(52) U.S. Cl.
CPC ..... *H04N 23/85* (2023.01); *G09G 2320/0693*
(2013.01); *G09G 2340/06* (2013.01)

(56)                    References Cited

U.S. PATENT DOCUMENTS

| | | | | |
|---|---|---|---|---|
| 2005/0248783 | A1* | 11/2005 | Tin ........................... | H04N 1/60 |
| | | | | 358/1.9 |
| 2009/0033677 | A1 | 2/2009 | Bezryadin | |
| 2018/0117849 | A1* | 5/2018 | Brunton ................ | B29C 64/386 |
| 2021/0199505 | A1* | 7/2021 | Alleysson ............... | G01J 3/506 |

OTHER PUBLICATIONS

French Search Report issued on Feb. 23, 2022, in corresponding French Application No. 2107117, 2 pages.
Ivar Farup, "Hyperbolic geometry for colour metrics" Optics Express, vol. 22, No. 10, May 14, 2014 (May 14, 2014), p. 12369, 10 pages.

* cited by examiner

[Fig. 1A]
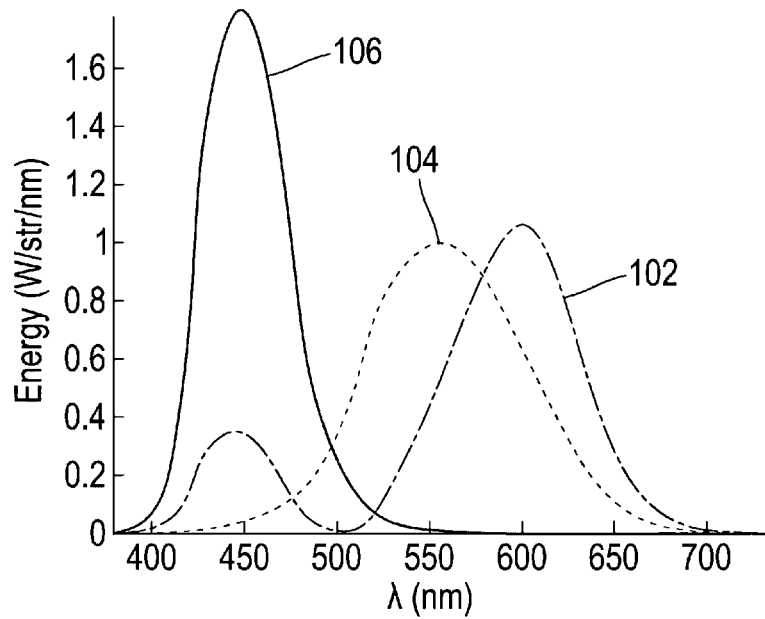
[Fig. 1B]
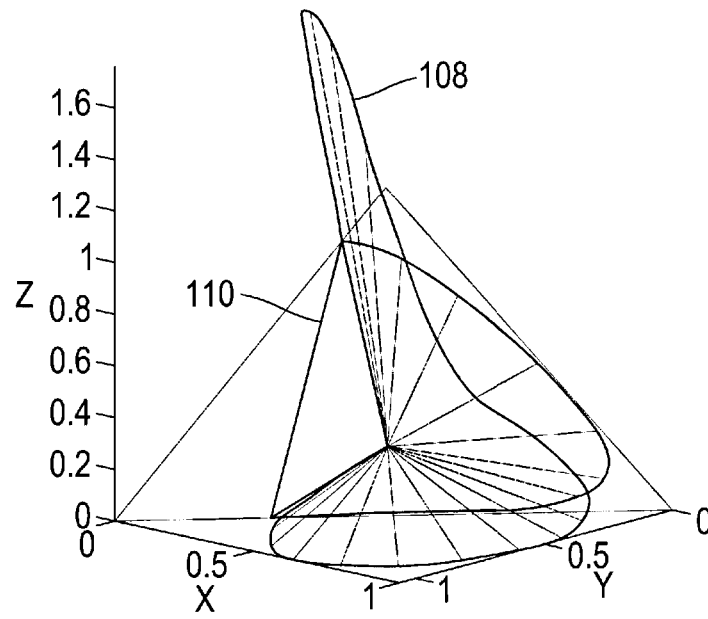

[Fig. 2]
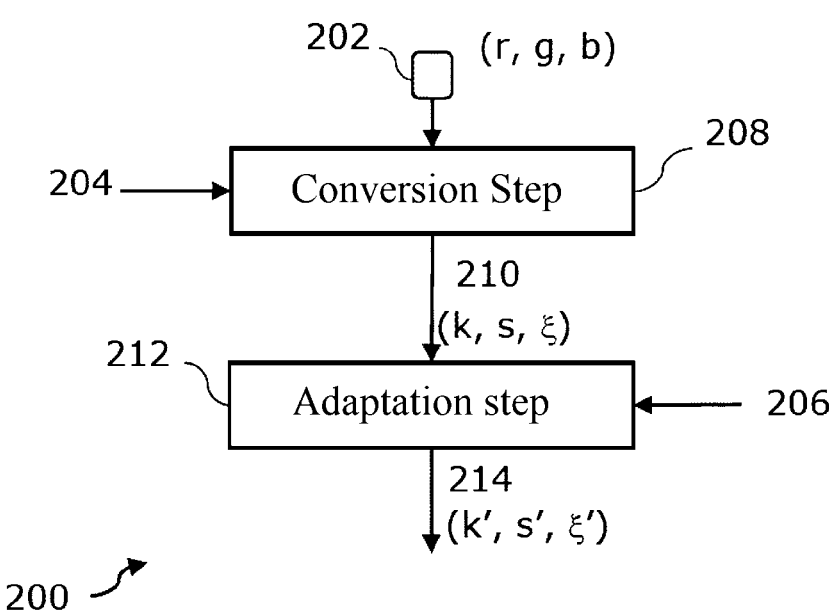
[Fig. 3]
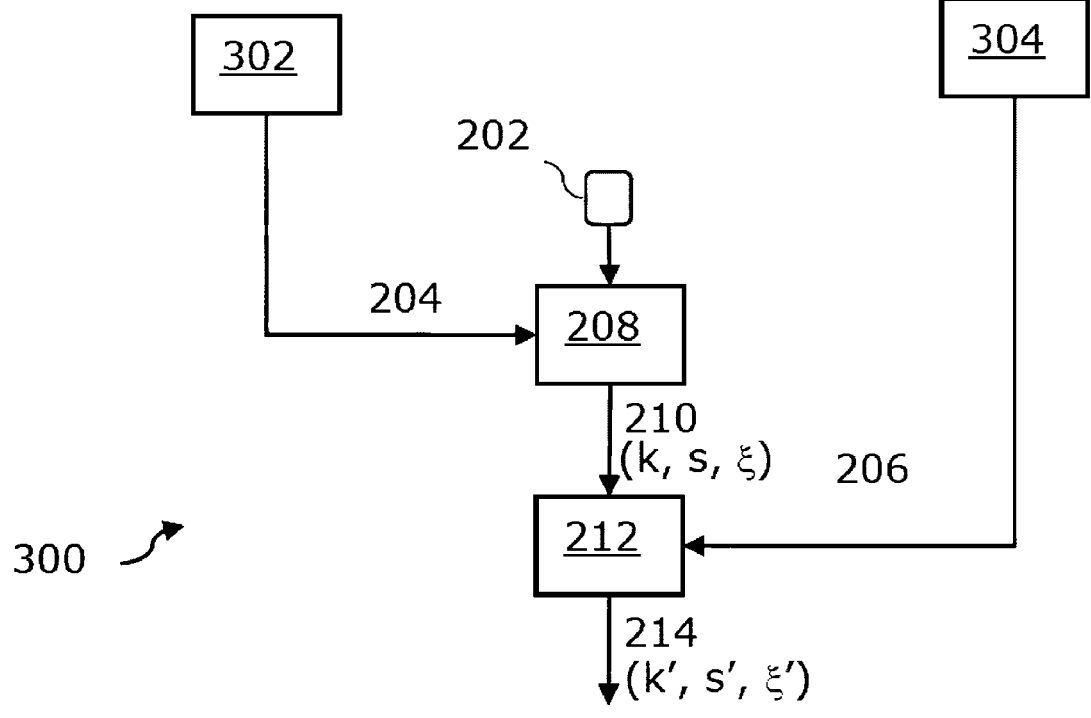

[Fig. 4]
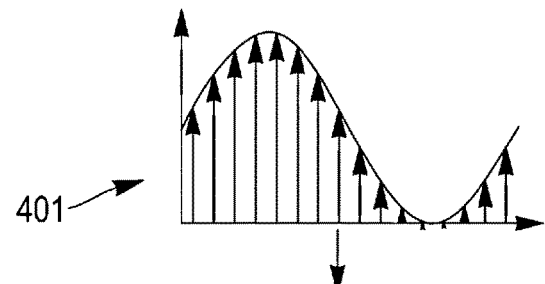
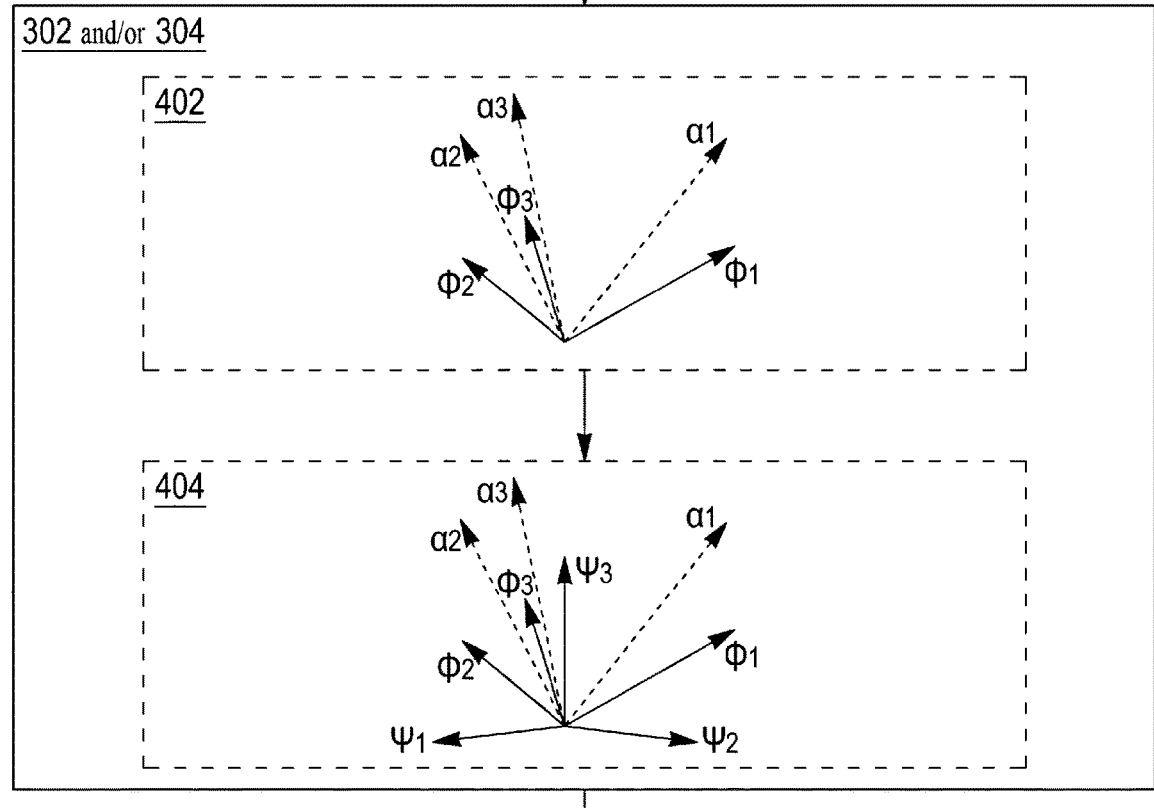
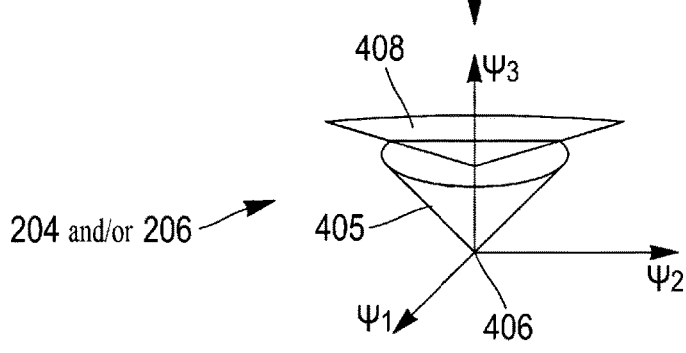

[Fig. 5]
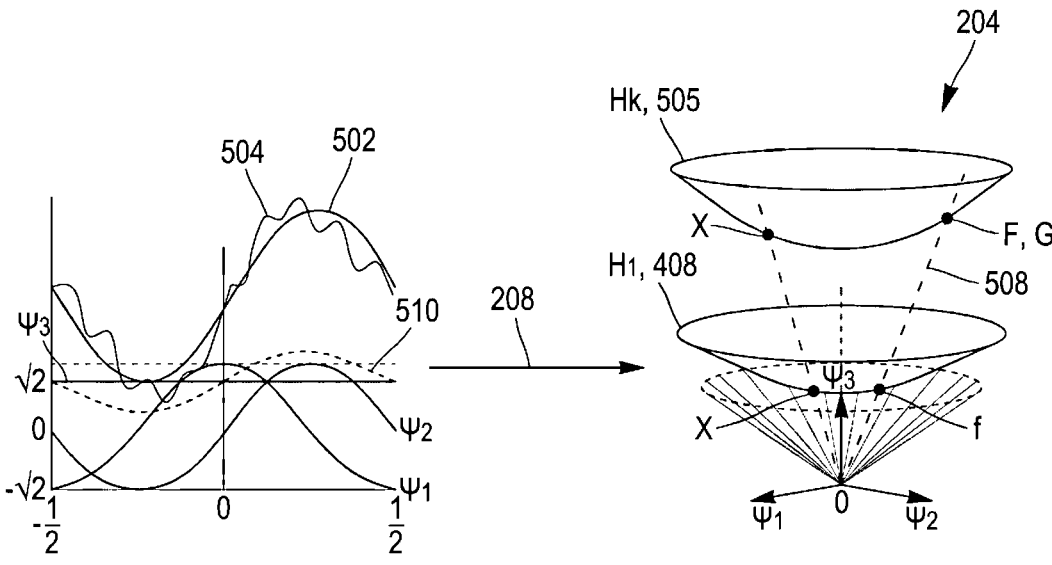
[Fig. 6A]
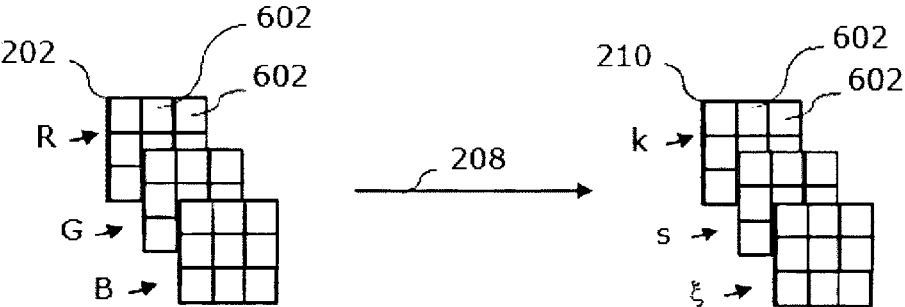
[Fig. 6B]
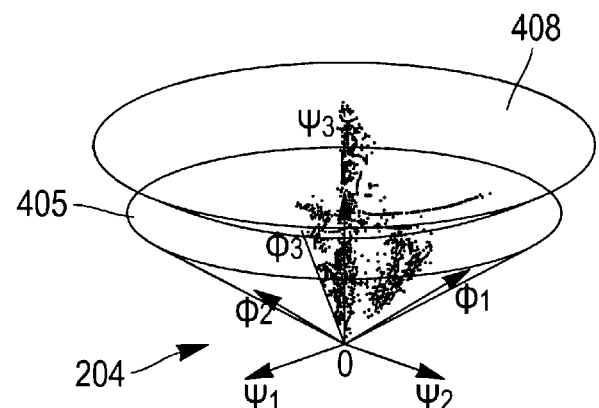

[Fig. 7]
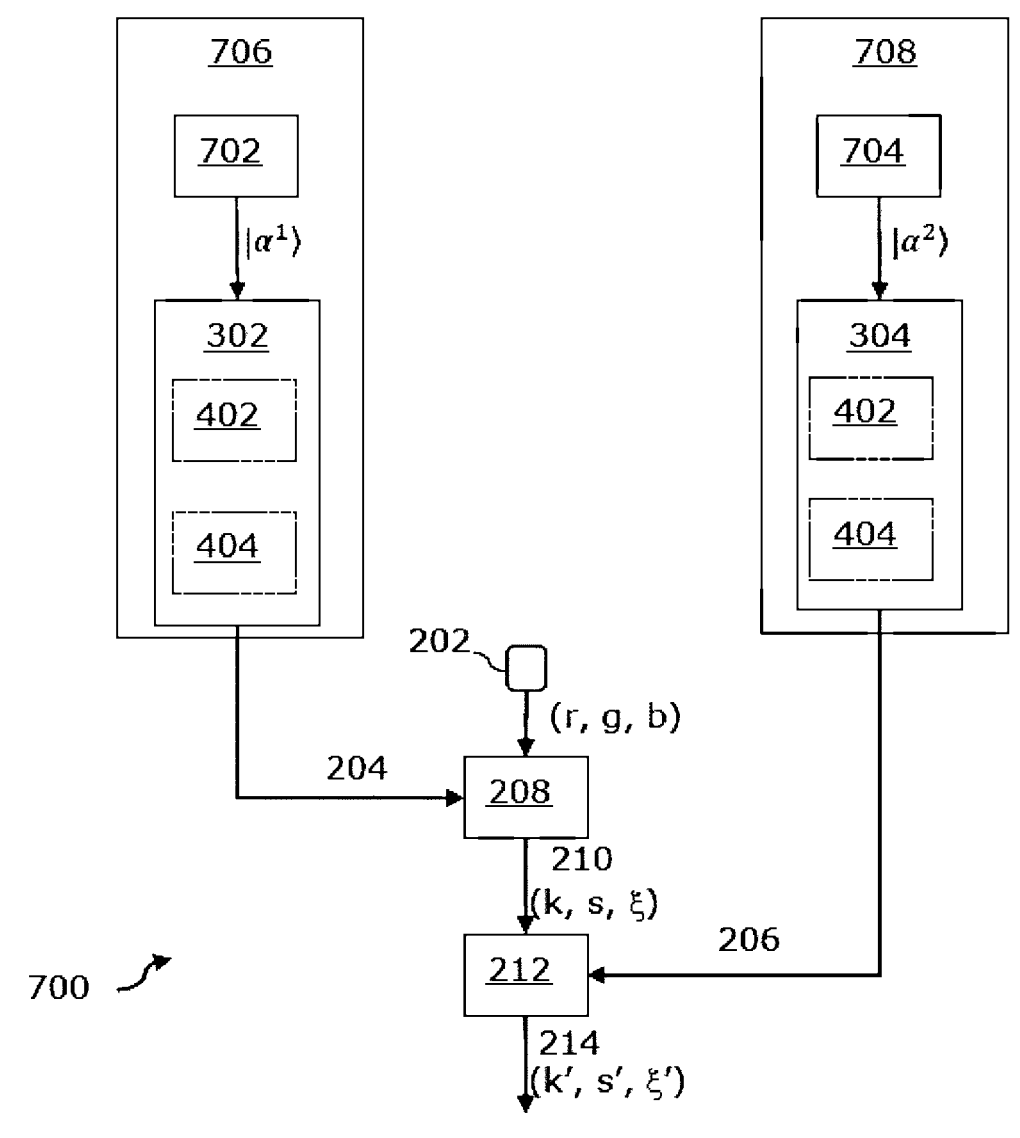

[Fig. 8]
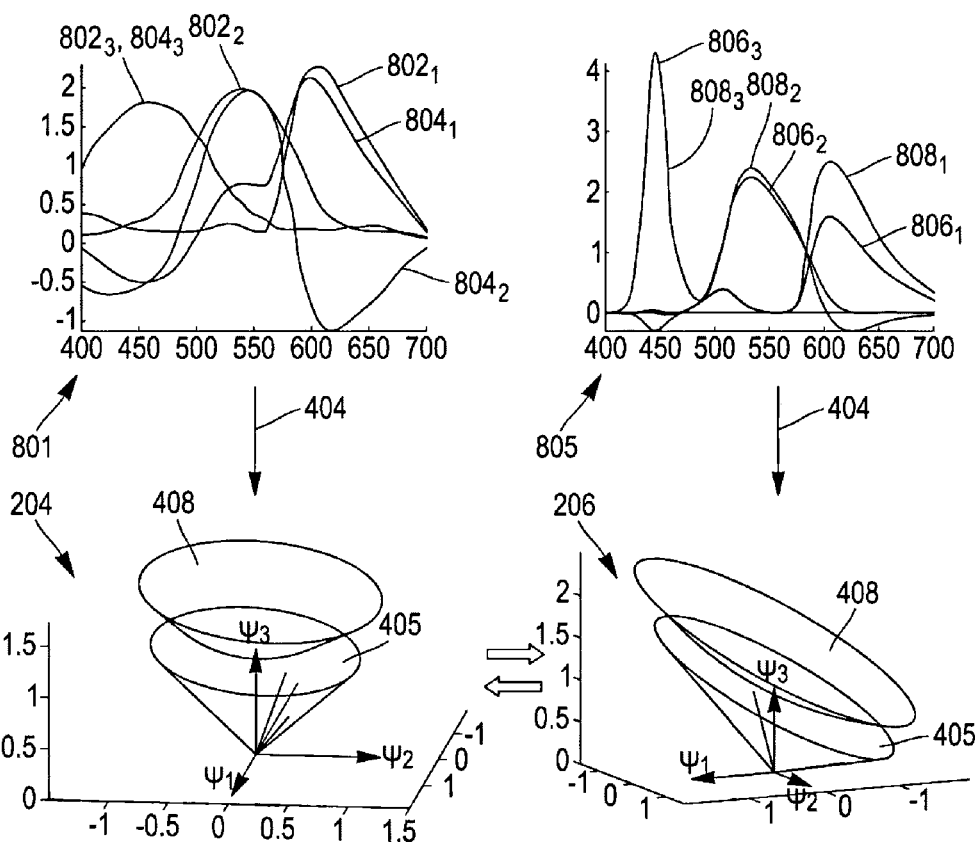
[Fig. 9]
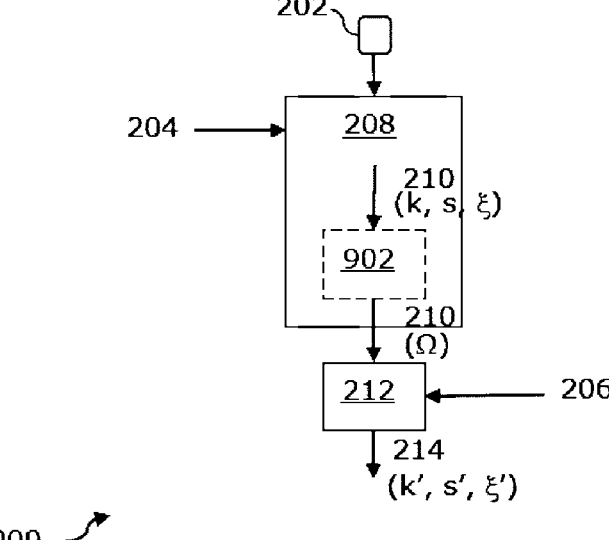

[Fig. 10]
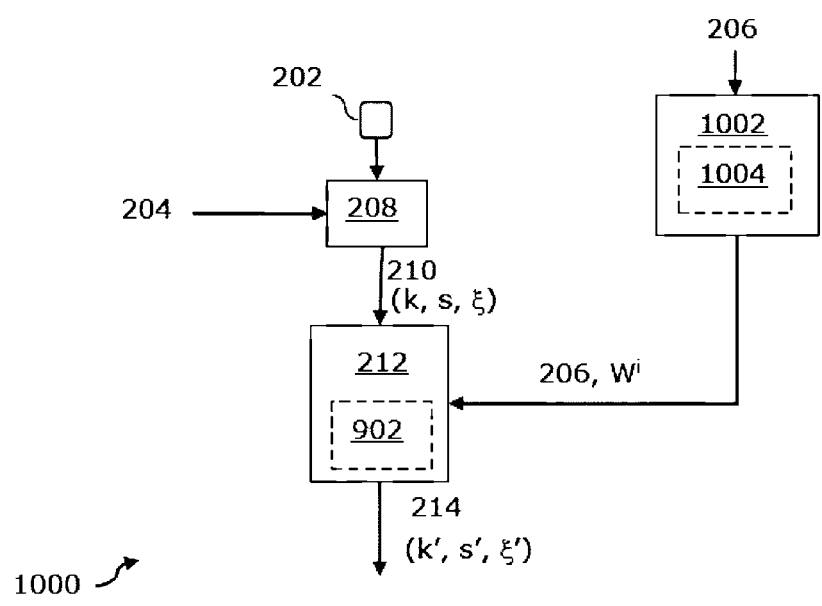
[Fig. 11]
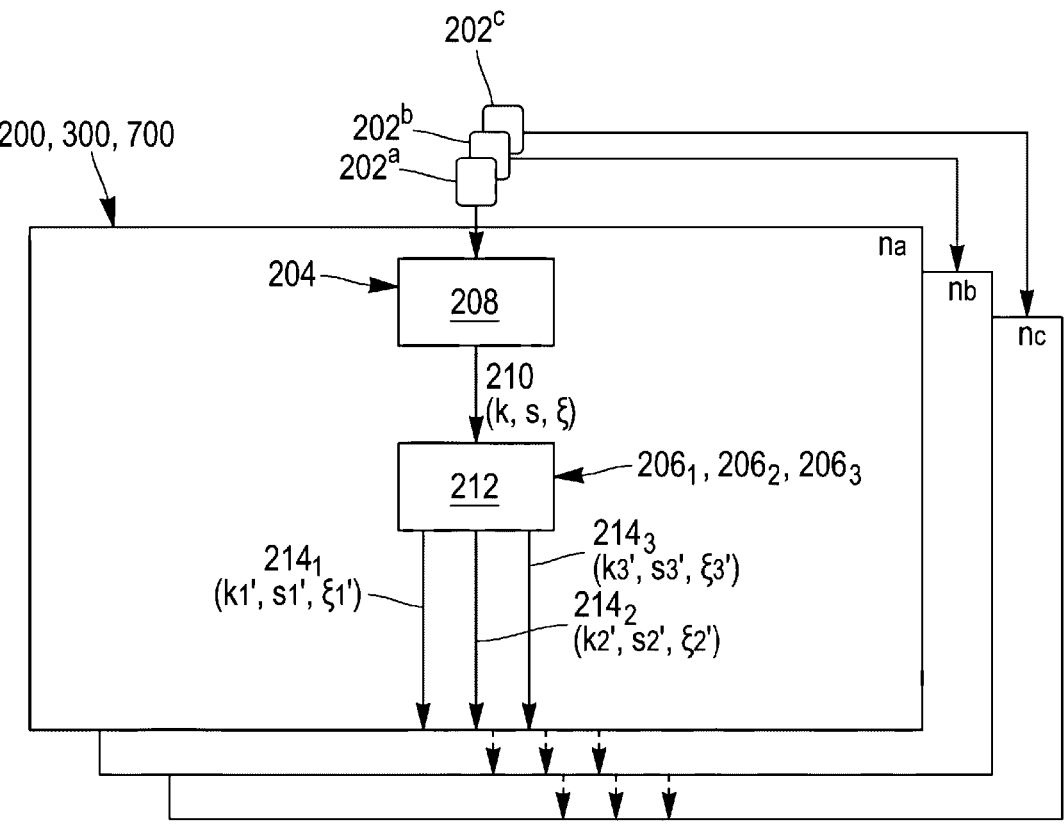

[Fig. 12]
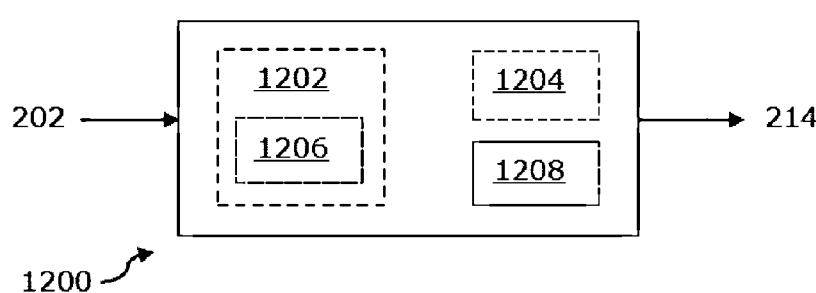
[Fig. 13]
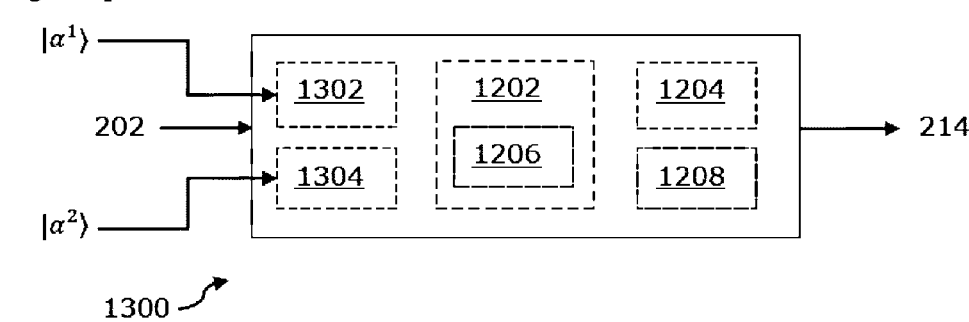
[Fig. 14]
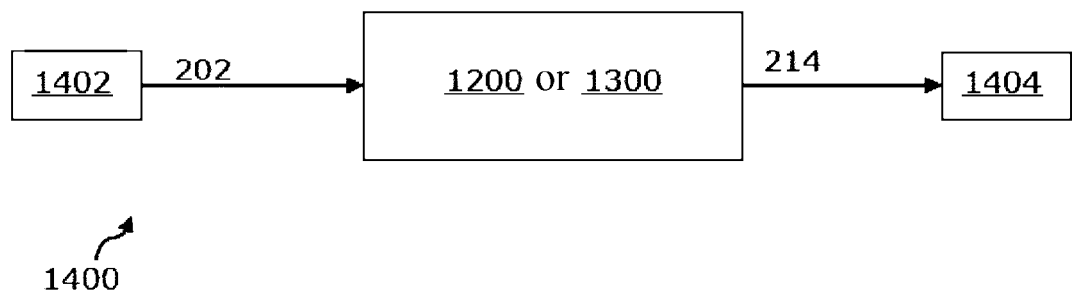
[Fig. 15]
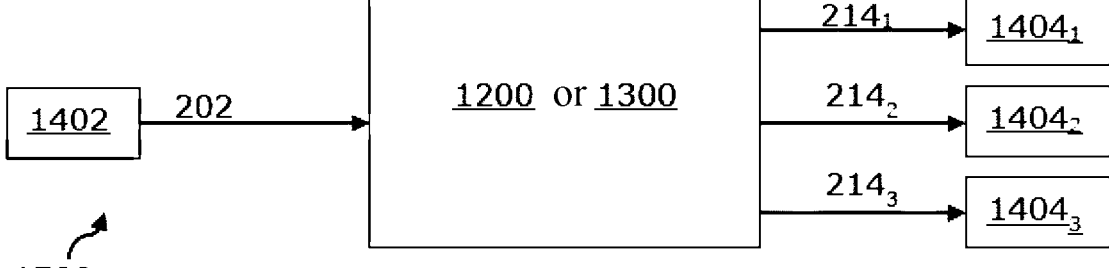

METHOD FOR CONVERTING DATA BETWEEN COLOUR SPACES

TECHNICAL FIELD

This invention relates to a method for converting at least one piece of data between the colour spaces of several colourimetric systems. The invention also relates to a computer program and a device implementing such a method.

The field of the invention is that of conversion of images between different colour spaces.

BACKGROUND

Colour vision in a colourimetric system depends on the colour space (also known as the colourimetric space) of the same. According to the state of the art, it is known to represent these colour spaces according to three parameters defined in relation to the human vision system. For example, in order to have a description of colours in accordance with human vision, the International Commission on Illumination (CIE for "Commission Internationale de l'éclairage") has defined a reference space, called the CIE1931 XYZ space, enabling data to be expressed in a colour space in accordance with human vision. Based on this representation, it was decided to standardise the colour spaces of colourimetric systems.

Following this principle, the CIE XYZ space is defined in each colourimetric system. This has a number of drawbacks, as the colour spaces of the colourimetric systems have ultimately to adapt to the CIE-XYZ representation. As a result, the colour spaces of colourimetric systems do not depend directly on intrinsic characteristics of the colourimetric system, but on standardised properties.

Furthermore, according to this standard, it is not possible to switch directly from one colour space of a colourimetric system to another colour space of another colourimetric system. As a result, conversion of a piece of data from one colourimetric system to another lacks accuracy, may contain several errors and cannot be implemented easily.

SUMMARY

One purpose of the present invention is to remedy at least one of the aforementioned drawbacks.

Another purpose of the invention is to provide a data conversion method applicable to all conversion systems.

Another purpose of the invention is to provide a method for converting data between different colour spaces that is easier to implement.

Another purpose of the invention is to provide a method for converting data between more accurate colourimetric systems.

The invention makes it possible to achieve at least one of the aforementioned purposes by a computer implemented method, for converting at least one piece of data, referred to as initial piece of data, between a colour space of at least one colourimetric system, referred to as first colourimetric system, and a colour space of at least one colourimetric system, referred to as second colourimetric system, the at least one initial piece of data consisting of at least one element expressed in a colourimetric reference frame, referred to as initial reference frame, said method comprises the following steps of:
> converting the at least one initial piece of data into at least one piece of data, referred to as projected piece of data, by expressing the at least one element in the colour space of the at least one first colourimetric system or of the at least one second colourimetric system, adapting the at least one projected piece of data into at least one piece of data, referred to as adapted piece of data, by expressing the at least one element in the colour space of the at least one first colourimetric system or of the at least one second colourimetric system using a transfer function relating the colour spaces of the at least one first colourimetric system and of the at least one second colourimetric system, said colour space of the at least one adapted piece of data being different from the colour space of the at least one projected piece of data, characterised in that the colour space of the at least one first colourimetric system and of the at least one second colourimetric system are each a hyperbolic space defined by a hyperbolic metric projective reference frame.

Thus, according to the method according to the invention, the colour spaces or colourimetric spaces of each colourimetric system are expressed according to a same colour representation model. In this way, it is very easy to convert data from a colour space associated with one colourimetric system to another colour space associated with another colourimetric system.

The colour spaces of the colourimetric systems no longer have to adapt to the CIE XYZ space or to come as close as possible to the CIE space. Instead, according to the method used, each colour space is defined on the basis of the colourimetric system considered.

Thus, the method according to the invention provides a colour space based on a hyperbolic metric projective model. These colour spaces are constructed or codified using mathematical elements, which ensures that the method is universal in nature because:
> it is applicable to any initial piece of data carrying colour information, and
> it is transposable to all colourimetric systems.

Colour spaces according to the method are mathematically conceptualised, unlike the state of the art in which colour spaces were defined by a standard, for example the CIE standard, with the consequence that it was necessary to adapt the colourimetric systems (and therefore the colour spaces of the colourimetric systems) to this standard rather than seeking a model applicable to all colourimetric systems. The method thus enables data to be exchanged easily, accurately and rigorously between these colour spaces.

As the colour spaces are all defined by a hyperbolic metric, conversion of a piece of data from one space to another is made easier.

Especially, the transfer function allows correspondence between the first colourimetric system and the second colourimetric system. As a result, conversion of data between the colour spaces can be carried out in both directions.

The first colourimetric system may comprise at least one acquisition means and/or at least one display means.

The second colourimetric system may comprise at least one display means and/or at least one acquisition means different from the at least one first colourimetric system.

The acquisition means may comprise or consist of a video camera, and/or a photographic camera, and/or a smartphone etc.

The display means may comprise or consist of a screen, smartphone etc.

The conversion step may comprise a step of changing reference frame from the initial reference frame to a hyperbolic metric projective reference frame by using at least one mathematical operator to express the at least one element of the at least one initial piece of data in the hyperbolic colour space of the at least one first colourimetric system or of the at least one second colourimetric system.

Thus, according to the method according to the invention, it is possible to convert the initial piece of data by expressing each element of the initial piece of data in the hyperbolic metric projective reference frame of the colourimetric system considered.

This conversion is thus mathematically defined, which makes it possible to improve accuracy, rigour and efficiency of the method according to the invention. Furthermore, this makes it possible to express any piece of data in a hyperbolic colour space in a simplified manner.

The at least one mathematical operator can comprise at least one projection operator comprising:

a decorrelation matrix $\Gamma$, and/or a Euclidean rotation matrix P.

Thus, switching from one space to another is defined according to a mathematical framework. Mathematical operator or operators for expressing an initial piece of data in a hyperbolic colour space are operators with which a person skilled in the art is familiar. Therefore, this favours simple implementation of the method according to the invention. These mathematical operators can be used separately or in combination.

If the initial reference frame is a hyperbolic reference frame, then the at least one mathematical operator may comprise an identity matrix.

Preferably, the hyperbolic metric projective reference frame of the at least one first colourimetric system and the at least one second colourimetric system may comprise a common projective axis.

The hyperbolic metric projective reference frames according to the invention thus have links in common. Therefore this favours easier conversion of a piece of data expressed in a first (hyperbolic) colour space to another (hyperbolic) colour space and vice versa.

The hyperbolic space can comprise a convex cone oriented along an axis of the hyperbolic metric projective reference frame, preferably along the common projective axis, and with an aperture of $2^{0.5}$.

Thus, the colour spaces are defined according to a cone which is similar to the human colour perception model.

For example, the cone can be defined according to the theory of Huseyin Yilmaz in documents "*On Color Perception*", Applied Research Laboratory, Sylvania Electronic Systems, Walham; and "*Color Vision and New approach to General Perception*", Applied Research Laboratory, Sylvan Electronic Systems, A division of Sylvania Electric Products, Inc. Waltham, Massachusetts, which define one example of representation of a colour space associated with human vision. In this example, colour perception is represented in terms of a three-dimensional cone, which enables colour perception to be expressed in terms of the perceptual attributes of hue, saturation and intensity. The cone can include an envelope. The image of the Dirac distributions, the basis of the space of spectral functions, forms the envelope of the cone in $R^3$. The envelope of the cone is the locus of maximum saturation colours. Each positive spectral function can be represented as a point inside the cone. The envelope of the cone represents the set of pure hue colours with maximum saturation.

The hyperbolic metric projective reference frame of the at least one first colourimetric system and/or of the at least one second colourimetric system can be constructed in an $R^4$ base.

This characteristic makes it possible to describe the transformation as a projective transformation. In this way, projective reference frames are constructed on transformations in $R^4$.

The hyperbolic metric projective reference frame can include a canonical projective reference frame with an associated canonical metric. By canonical projective space, it is meant a model of the hyperboloid.

The advantage of such a dimension is that it is possible to change the point of view, that is to change origin of an affine reference frame and consequently that of the canonical projective reference frame, constructed on the affine reference frame by adding the direction of the projection thereto. The conversion and/or adaptation step can thus be performed in $R^4$.

Each hyperbolic metric projective reference frame can preferably be defined by:

a black point defining the origin of the hyperbolic metric projective reference frame, three base vectors, preferably three orthogonal base vectors, and a white point defined by the sum of the three base vectors.

Defining a projective reference frame thus makes it possible to express the transformations between the different projective reference frames, which, according to the invention, are the hyperbolic metric projective reference frames. The projection and adaptation steps are thus facilitated, more accurate and easier to implement.

The three base vectors can thus be used to define a vector space. The white point can preferably define a measure to 1.

The white point can be offset relative to the black point by a translation of the affine transformation.

At least one vector of the hyperbolic metric projective reference frame of the at least one first colourimetric system and/or of the at least one second colourimetric system may be a unit vector.

Such a vector thus serves as a length "standard" for defining a length in the other hyperbolic colour spaces, preferably along the common projective axis. This improves the ease with which the method according to the invention can be implemented, especially by making it easier to perform calculations required to switch from one colour space to another. The ease of implementation and saving in calculation time are thus improved.

The hyperbolic colour space can represent the ideal observer under the illuminant of equal energy.

Each hyperbolic colour space can comprise a unit hyperboloid, the projected piece of data and/or the adapted piece of data can comprise at least one component, preferably at least one colour component, expressed in the unit hyperboloid.

Thus, according to the method according to the invention, the projected piece of data and the adapted piece of data can comprise at least one component expressed on a unit hyperboloid, which facilitates conversion of data from one colour space to another. Several components can be expressed in the unit hyperboloid.

Preferably, the components expressed in the unit hyperboloid can be the chrominance components.

Thus, according to the method according to the invention, components carrying colour information are expressed in the unit hyperboloid. This makes it possible to obtain a common coding of the projected and/or adapted piece of data, which makes it possible to obtain data (projected and adapted) that are independent and invariant to one experimental condition. The colour components of the adapted and/or projected data can thus be more easily compared and/or modelled and/or converted. Especially, this makes it possible to compare the at least one projected piece of data and the at least one adapted piece of data in a same mathematical space. The process of adapting human vision is then a transformation which leaves the mathematical space invariant. This thus improves the ease of converting the initial piece of data into projected piece of data and converting the projected piece of data into adapted piece of data.

The unit hyperboloid can preferably be centred on the common projective axis.

This facilitates data conversion.

The transfer function used in the adaptation step can be a diagonal matrix. Such a matrix facilitates calculations used in the adaptation step. The method according to the invention is therefore easier to implement and takes longer to calculate.

The transfer function used in the adaptation step can comprise an identity matrix.

Thus, according to the method according to the invention, an identity matrix can be used to match points of one hyperbolic colour space to another. The calculation time and ease of implementation of the method according to the invention are further improved.

The projection step and/or the adaptation step may comprise a step of correcting the hyperbolic colour space of the at least one first colourimetric system and/or of the at least one second colourimetric system by using a hyperbolic rotation matrix $\Omega$.

Preferably, the hyperbolic rotation matrix is used when the projective axes between the hyperbolic projective reference frames are not collinear.

Prior to the conversion step, the method according to the invention may comprise, a step of designing the hyperbolic colour space of the at least one first colourimetric system from a spectral function of the at least one first colourimetric system, and/or
   a step of designing the hyperbolic colour space of the at least one second colourimetric system on the basis of a spectral function of the at least one second colourimetric system.

Thus, according to the method according to the invention, it is possible to construct a hyperbolic colour space for each colourimetric system from their spectral function, also called spectral distribution.

Thus, according to the method according to the invention, it is possible to create a hyperbolic colour space for any colourimetric system.

Preferably, each design step can comprise the following steps of:

projecting the spectral function of the at least one first colourimetric system and/or the at least one second colourimetric system into an orthonormal reference frame, and
   projecting said spectral function of the at least one first colourimetric system and/or the at least one second colourimetric system expressed in the orthonormal reference frame into a hyperbolic metric projective reference frame.

Each projection step may comprise changing reference frame. Thus, according to the method according to the invention, the hyperbolic colour space is created from the spectral function of the colourimetric system by performing reference frame change operations. These operations are easy to implement.

The spectral function of the colourimetric system considered may be known, or given by the manufacturer or measured in a calibration phase.

Thus, if the spectral function is not known and the colourimetric system in question is available, it is possible to measure this spectral function.

If the spectral function of a colourimetric system can be measured, then the design step may comprise the steps below.

When the at least one first colourimetric system and/or the at least one second colourimetric system comprises at least one acquisition means, then said method may comprise a calibration phase, referred to as first calibration phase, for defining the hyperbolic metric projective reference frame of the at least one acquisition means, said first calibration phase possibly comprising a step of measuring a spectral function of the at least one acquisition means using a spectrophotometer and/or a monochromator.

The step of measuring the spectral function of the at least one acquisition means may comprise the following steps of:

emitting spectral light, referred to as reference spectral light, by a monochromator, to the at least one acquisition means and to said spectrophotometer,
   comparing responses recorded by the spectrophotometer and by the at least one acquisition means.

When the at least one first colourimetric system and/or the at least one second colourimetric system comprises at least one display means, then said method may comprise a calibration phase, referred to as second calibration phase, for defining the hyperbolic metric projective reference frame of the at least one display means, said second calibration phase possibly comprising a step of measuring a spectral function of the at least one display means by a spectrophotometer.

Thus, if a colourimetric system comprises a display means, then a spectrophotometer may be required to measure the spectral function of said colourimetric system. Conversely, if the colourimetric system comprises an acquisition means, then a spectrophotometer and a monochromator may be required to measure the spectral function of said colourimetric system.

The at least one display means may comprise a screen (for example a computer screen, television screen, smartphone screen, etc.).

The at least one acquisition means may comprise, for example, a video camera, a photographic camera, a smartphone, etc.

The at least one initial piece of data may be an image and the at least one element may be a pixel of the initial image.

By way of non-limiting example, the at least one piece of data may comprise an image comprising pixels expressed in an initial R, G, B, or HSV reference frame, or in a hyperbolic metric projective reference frame, etc.

Thus, the method is functional with different types of colour coding models.

In one alternative, the at least one initial piece of data can be the power spectral density of a monochromatic or polychromatic light. The projected piece of data and the adapted piece of data can be the spectrum of a light.

Thus, according to the method according to the invention, it is possible to use any initial piece of data as long as this initial piece of data carries information about the colour.

The initial piece of data may come from the at least one first colourimetric system or from the at least one second colourimetric system or may be of any origin.

Thus, the method according to the invention can operate with initial data coming from a known colourimetric system, or from a colourimetric system whose spectral function can be measured, or can be of any origin, for example when the colourimetric system is unavailable or unknown (for example when the initial piece of data is extracted from any database).

This favours efficiency, easy implementation and universal nature of the method according to the invention.

If the initial piece of data is of unknown origin or if it is impossible to find spectral function of the at least one first colourimetric system or of the at least one second colourimetric system, then the base change of the conversion step can be performed by the Euclidean rotation matrix P.

The Euclidean rotation matrix P can comprise a white balance matrix. This matrix can be a diagonal matrix if the projective axes of the hyperbolic projective reference frames are common.

The at least one projected piece of data may be an image. The projected image may be of the same nature as the initial piece of data.

Thus, the method according to the invention does not lose any information during the step of converting the initial piece of data into a projected image. All the elements of the initial piece of data are thus preserved.

The at least one projected piece of data may comprise three components:
an intensity component k,
a saturability component s, and
a hue component $\xi$.

The at least one adapted piece of data may comprise three components:
an intensity component k',
a saturability component s', and
a hue component $\xi$'.

Thus, according to the method according to the invention, the projected piece of data and/or the adapted piece of data comprise an intensity component and two chrominance components defined by the hue and saturability components. Thus, according to the method according to the invention, the colour information of the data is described according to a physiological approach to colour by the human eye.

The intensity component can preferably be a variable component. This ensures that the projected piece of data is adapted to the light level of the relevant colourimetric systems. In this way, intensity components of the data (projected, adapted) from one (hyperbolic) colour space to another are related by a proportionality factor, making it easier to convert data from one (hyperbolic) colour space to another without losing information.

According to another aspect of the invention, a computer program is provided comprising instructions executable by a computing device, which when executed, implement all the steps of the method according to the invention.

The computer program may be in any computer language such as C, C++, JAVA, Python, machine language, etc.

According to another aspect of the invention, a computing device is provided comprising means configured to implement all the steps of the method according to the invention.

The data processing device may be a PC, a smartphone, a tablet, a calculator unit or any other computing and/or electronic apparatus.

In particular, the data processing device may be an electronic card comprising at least one analogue component and/or at least one digital component.

In one particular embodiment, the data processing device may be a processor, a chip, a calculator, etc.

The data processing device may comprise a CPU. In a non-limiting manner, the device may comprise at least one internet and/or external memory and a data bus connected to these memories.

According to another aspect of the invention, an equipment is provided for converting at least one piece of data between at least one acquisition means and at least one display means, characterised in that it comprises:
a computing device comprising means configured to implement all the steps of the method according to the invention,
at least one acquisition means arranged to acquire at least one piece of data, referred to as acquired piece of data, and/or
at least one display means for displaying at least one piece of data, referred to as displayed piece of data.

The at least one acquired piece of data may correspond to the at least one initial piece of data, for example an rgb image.

The at least one displayed piece of data may correspond to the at least one initial piece of data, for example an rgb image, or the at least one projected piece of data.

BRIEF DESCRIPTION OF THE DRAWINGS

Further advantages and features of the invention will become apparent upon reading the detailed description of implementations and embodiments, which are by no means limiting, and the following appended drawings.

FIG. 1A is a schematic representation of one example of spectral functions according to CIE1931 XYZ;

FIG. 1B is a schematic representation of the colour space associated with the spectral functions of FIG. 1A;

FIG. 2 is a schematic representation of a first non-limiting exemplary embodiment of a method according to the invention;

FIG. 3 is a schematic representation of a second non-limiting exemplary embodiment of a method according to the invention;

FIG. 4 is a schematic representation of a non-limiting exemplary embodiment of a step according to the invention of designing a hyperbolic colour space of a colourimetric system;

FIG. 5 is a schematic representation of a first non-limiting exemplary embodiment of a conversion step of the method according to the invention;

FIG. 6A is a schematic representation of a second non-limiting exemplary embodiment of a conversion step of the method according to the invention;

FIG. 6B is a representation of all the elements making up the initial piece of data in FIG. 6A, represented in a hyperbolic colour space.

FIG. 7 is a schematic representation of a third non-limiting exemplary embodiment of a method according to the invention;

FIG. 8 is a schematic representation of a third example of a step of designing the hyperbolic colour space according to the invention of a first colourimetric system on the basis of a spectral function of the first colourimetric system and a step of designing the hyperbolic colour space according to the invention of a second colourimetric system on the basis of a spectral function of the second colourimetric system;

FIG. 9 is a schematic representation of a fourth non-limiting exemplary embodiment of a method according to the invention;

FIG. 10 is a schematic representation of a fifth non-limiting exemplary embodiment of a method according to the invention;

FIG. 11 is a schematic representation of one example of several iterations of a method according to the invention;

FIG. 12 is a schematic representation of a first example of a device according to the invention;

FIG. 13 is a schematic representation of a second example of a device according to the invention;

FIG. 14 is a schematic representation of a first example of equipment according to the invention;

FIG. 15 is a schematic representation of a second example of equipment according to the invention.

DETAILED DESCRIPTION

It is understood that embodiments described below are by no means limitative. It is especially possible to envisage alternatives to the invention comprising only a selection of the characteristics described hereinafter in isolation from the other characteristics described, if this selection of characteristics is sufficient to confer a technical advantage or to differentiate the invention from prior art. This selection includes at least one characteristic which is preferably functional without structural details, or with only part of the structural details if this part alone is sufficient to confer a technical advantage or to differentiate the invention from prior art.

In particular, all the alternatives and all the embodiments described can be combined with each other if there is nothing technically opposite to such a combination.

In the figures, elements common to several figures retain the same reference.

FIG. 1A illustrates three spectral functions, noted 102, 104 and 106 respectively, in a colour space defined by the CIE1931 XYZ.

These spectral functions 102, 104, 106 are called colourimetric functions of the reference CIE observer. These spectral functions 102, 104, 106 represent a chromatic response of a "normalised" human eye. This means that these spectral functions 102, 104, 106 are normalised and are not related to characteristics in colourimetric systems other than the human eye.

FIG. 1B illustrates a colour space 108 defined from the spectral functions 102, 104, 106 of the FIG. 1A part. The colour space 108 is not hyperbolic. A chromaticity diagram 110, known as the CIE chromaticity diagram, can be drawn from the colour space 108. The chromaticity diagram 110 is two-dimensional. Each dimension of the chromaticity diagram depends on a spectral function 102, 104, 106 defined in FIG. 1A.

FIG. 2 is a schematic representation of a non-limiting exemplary embodiment of a method 200 according to the invention.

The method 200 illustrated in FIG. 2 is a computer-implemented method.

In this example, the method 200 relates to the conversion of at least one piece of data between a colour space 204 of a first colourimetric system and a colour space 206 of a second colourimetric system.

The at least one initial piece of data 202 consists of at least one element expressed in a colourimetric reference frame, called the initial reference frame.

The method 200 comprises the following steps of:

converting 208 the at least one initial piece of data 202 into at least one piece of data, referred to as projected piece of data 210, by expressing the at least one element in the colour space 204 of the first colourimetric system, adapting 212 the at least one projected piece of data 210 into at least one piece of data, referred to as adapted piece of data 214, by expressing the at least one element in the colour space 206 of the second colourimetric system using a transfer function relating the colour spaces 204, 206 of the first colourimetric system and of the second colourimetric system, said colour space of the at least one adapted piece of data 214 being different from the colour space of the at least one projected piece of data 210.

The colour space 204, 206 of the first colourimetric system and of the second colourimetric system are each a hyperbolic space defined by a hyperbolic metric projective reference frame.

By way of non-limiting example, the initial piece of data 202 is an image 202 in R, G, B format. The element of the initial piece of data 202 is, in this example, a pixel comprising coordinates expressed in the initial reference frame which is an R, G, B reference frame.

Of course, in other alternatives to the method 200, said initial piece of data 202 may comprise several pixels (i.e. elements). In this case, the conversion and adaptation steps are applied to all the pixels of the initial piece of data 202.

Preferably, the conversion step 208 corresponds to a reference frame change step to switch from the initial R, G, B type reference frame to a hyperbolic metric projective reference frame. In the case of FIG. 2, this corresponds to a change of reference frame to the hyperbolic metric projective reference frame of the first colourimetric system. For this, at least one mathematical operator is used in the conversion step 208 to express the element of the initial piece of data 202 in the hyperbolic colour space of the first colourimetric system.

Preferably the mathematical operator is a projection operator. The projection operator may comprise:

a decorrelation matrix noted r, and/or a Euclidean rotation matrix noted P.

The conversion step 208 provides the projected piece of data 210.

The transfer function may comprise an identity matrix.

In the case of FIG. 2, the projected piece of data 210 is an image and comprises as many elements (i.e. pixels) as the initial piece of data 202. Thus, no information is lost after the conversion step 208.

By way of non-limiting example, the projected piece of data 210 comprises three components:

an intensity component, noted k, a saturability component, noted s, and a hue component, noted $\xi$.

The adaptation step 212 provides the adapted piece of data 214.

The adapted piece of data 214 is an image and comprises as many elements (i.e. pixels) as the initial piece of data 202. Thus no information is lost after the adaptation step 210.

By way of non-limiting example, the adapted piece of data 214 comprises three components:

an intensity component, noted k', a saturability component, noted s', and a hue component, noted $\xi'$.

By way of non-limiting example, the first colourimetric system is a camera and the second colourimetric system is a screen. According to this example, the initial reference frame can be the R, G, B reference frame of the camera.

In another alternative, the first colourimetric system is a first screen and the second colourimetric system is a second screen. In this example, the initial reference frame can be the R, G, B reference frame of the first screen.

Thus, according to the method 200, the first colourimetric system may be a display means or an acquisition means. The second colourimetric system may be a display means or an acquisition means.

FIG. 3 is a schematic representation of a non-limiting exemplary embodiment of a method 300 according to the invention.

The method illustrated in FIG. 3 comprises all the steps of the method 200 illustrated in FIG. 2.

Prior to the conversion step 208, the method 300 comprises a step 302 of designing the hyperbolic colour space 204 of the at least one first colourimetric system from a spectral function of the at least one first colourimetric system.

Prior to the conversion step 208, the method 300 comprises a step 304 of designing the hyperbolic colour space 206 of the at least one second colourimetric system from a spectral function of the at least one second colourimetric system.

FIG. 4 is one example of a representation of the step 302, 304 of designing the hyperbolic colour space of a colourimetric system that can be implemented by the method 300 when the spectral function of the colourimetric system is known or can be measured. According to this example, this may be the step 302 of designing the hyperbolic colour space of the first colourimetric system and/or the step 304 of designing the hyperbolic colour space of the second colourimetric system.

According to the method 300, the spectral function 401 of the at least one first colourimetric system and/or of the at least one second colourimetric system may be known, for example if these colourimetric systems have already been used or because the spectral functions of each colourimetric system have been given by the manufacturer.

Thus, according to this example, each design step 302, 304 may comprise the following steps of:

projecting 402 the spectral function of the first colourimetric system and of the second colourimetric system into an orthonormal reference frame, and projecting 404 said spectral function of the first colourimetric system and/or of the second colourimetric system expressed in the orthonormal reference frame into a hyperbolic metric projective reference frame.

By way of non-limiting example, the spectral function 401 is that of an acquisition means, such as a camera capable of recording light comprising wavelengths in the visible range. The spectral function 401 comprises positive values.

According to this example, the spectral function 401, defined by three measurement vectors $\alpha_1$, $\alpha_2$ and $\alpha_3$, is projected into the orthonormal reference frame defined by three vectors $\Phi_1$, $\Phi_2$, $\Phi_3$. The three vectors of the orthonormal reference frame define a matrix noted $|\Phi\rangle$. The three vectors of the measurement reference frame define a matrix denoted $|\alpha\rangle$.

In this example, the spectral function 401 projected into the orthonormal reference frame can be obtained using the following formula:

$$\langle\phi| = \Gamma\langle\alpha| \qquad \text{[Math 1]}$$

With $\Gamma$ corresponding to a decorrelation matrix, and $\langle\phi|$ corresponding to the vector matrix of the orthonormal reference frame and $\langle\alpha|$ corresponding to the vector matrix of the measurement reference frame.

In a first alternative, the decorrelation matrix $\Gamma$ may be known. In this case it is sufficient to apply the formula Math 1 to switch from one reference frame to another.

In a second alternative, the decorrelation matrix $\Gamma$ may be unknown. In this case, the decorrelation matrix can be calculated from the spectral function (in the measurement reference frame) of the colourimetric system considered by decorrelating the spectral function of said system considered.

Then, according to the method 300, the spectral function expressed in the orthonormal reference frame $\langle\Phi|$ is again projected into a hyperbolic metric projective reference frame comprising three vectors $\psi_1$, $\psi_2$, $\psi_3$. The three vectors of the hyperbolic metric projective reference frame define a matrix denoted $|\psi\rangle$.

In this example, the spectral function 401 projected into the hyperbolic metric projective reference frame can be obtained using the following formula:

$$\langle\psi| = P\langle\phi| \qquad \text{[Math 2]}$$

With P corresponding to the Euclidean rotation matrix, and $\langle\psi|$ corresponding to the vector matrix of the hyperbolic metric projective reference frame, and $\langle\phi|$ corresponding to the vector matrix of the orthonormal reference frame.

The Euclidean rotation matrix P is preferably known. Preferably, the Euclidean rotation matrix is written as $$P = \begin{bmatrix} -1/\sqrt{6} & 2/\sqrt{6} & -1/\sqrt{6} \\ 1/\sqrt{2} & 0 & -1/\sqrt{2} \\ 1/\sqrt{3} & 1/\sqrt{3} & 1/\sqrt{3} \end{bmatrix} \qquad \text{[Math 3]}$$

Thus, it is sufficient to apply the formula Math 2 to switch from the orthonormal reference frame to the hyperbolic metric projective reference frame. The last projection step 404 provides, at the output of the design step 302, 304, the hyperbolic colour space 204, 206 of the colourimetric system considered by defining the cone and the unit hyperboloid which are symmetrical relative to the axis $\psi_3$.

The unit hyperboloid and the cone can be related by a common metric defined preferably by a 4×4 matrix, preferably by a diagonal matrix comprising the diagonal values (−½, −½, 1, 1). The height of the cone along the axis 43 can be adapted so that the first colourimetric system corresponds with the second colourimetric system.

According to this example, the hyperbolic colour space 204, 206 of the colourimetric system is expressed in the hyperbolic metric projective reference frame. The hyperbolic metric projective reference frame is defined by a black point 406 defining the origin of the reference frame, three base vectors noted $\psi_1$, $\psi_2$, $\psi_3$, and a white point defined by an affix to the sum vector of the three base vectors noted $\Sigma\psi$.

Preferably, the three base vectors $\Phi_1$, $\psi_2$, $\psi_3$ are orthogonal to each other. Preferably the affix is 1. The hyperbolic metric projective reference frame can consist of an orthogonal reference frame defined by vectors $\Phi_1$, $\Phi_2$, $\psi_3$ and a direction of projection oriented along ¥3.

Thus, the hyperbolic metric projective reference frame is a reference frame of the affine space of dimension 4 constructed on $R^4$ and can be written using the following formulation (O, $\psi_1$, $\psi_2$, $\psi_3$, $\Sigma\psi$) where O corresponds to the origin 406 of the reference frame and $\Sigma\psi$ corresponds to the white point.

The hyperbolic colour space comprises a convex cone 405, also noted C in the following. The cone 405 is oriented along the white point $\Sigma\psi$ of the hyperbolic metric projective reference frame. In FIG. 4, the cone 405 is oriented along the axis carried by the vector $\psi_3$ of the hyperbolic metric projective reference frame. The cone 405 preferably has an aperture of $2^{0.5}$.

The vector $\psi_3$ of the hyperbolic metric projective reference frame is preferably a unit vector.

The cone 405 can be defined according to the theory of Huseyin Yilmaz in the documents "*On Color Perception*", Applied Research Laboratory, Sylvania Electronic Systems, Walham; and "*Color Vision and New approach to General Perception*", Applied Research Laboratory, Sylvan Electronic Systems, A division of Sylvania Electric Products, Inc. Waltham, Massachusetts. The cone 405 may comprise an envelope. The envelope of the cone 405 is formed from Dirac distributions representing visible monochromatic colours. The envelope of the cone 405 is the locus of the colours of maximum saturation. Each positive spectral function can be represented as a point inside the cone. The envelope of the cone represents the set of pure hue colours with maximum saturation.

The vector $|\psi_3\rangle$ is preferably a unit vector.

The hyperbolic colour space 204, 206 of the colourimetric system of FIG. 4 also comprises a unit hyperboloid 408. The unit hyperboloid 408 may represent the constant intensity metamerism space.

FIG. 5 is one example of a schematic representation of the step 208 of converting two initial data F, G into a hyperbolic colour space 204 of a colourimetric system (for example of the first colourimetric system) defined from spectral data of said colour space.

FIG. 5 shows a representation of a spectral function 502 of a piece of data F and a representation of a spectral function 504 of a piece of data G, thus showing the three vector components $\psi_1$, $\psi_2$, $\psi_3$ of the spectral function of a colourimetric system.

Following the conversion step 208, each initial piece of data F or G is represented in the hyperbolic colour space of the colourimetric system defined on the basis of the spectral function of said colourimetric system. The hyperbolic colour space is defined on the basis of the three vectors $\psi_1$, $\psi_2$, $\psi_3$ defining the matrix $|\psi\rangle$ in the hyperbolic metric projective reference frame. The vector $\psi_3$ is a unit vector.

In this example, the data F and G are polychromatic lights.

The spectral functions of the initial data F and G can be expressed in the hyperbolic metric projective reference frame through a linear application, denoted oe. For example, for the initial piece of data F, the linear application is defined as:

$$oe: \mathcal{L} \rightarrow \mathbb{R}^3 \qquad \text{[Math 4]}$$

$$|F\rangle \mapsto x = oe(|F\rangle) = \langle\psi \mid F\rangle = \begin{bmatrix} F_1 \\ F_2 \\ F_3 \end{bmatrix} \qquad \text{[Math 5]}$$

With x corresponding to a point in hyperbolic colour space and F a spectral function (depending on wavelength) representing a light, and F1, F2, F3 corresponding to the components of the initial piece of data F expressed in the hyperbolic metric projective reference frame of the colourimetric system considered.

Each light, denoted $F(\xi)=|F\rangle$, is thus represented by a linear combination of three base functions, denoted $$|F\rangle = F_1|\psi_1\rangle + F_2|\psi_2\rangle + F_3|\psi_3\rangle \qquad \text{[Math 6]}$$

The hyperbolic colour space 204, 206 comprises the cone 405 with an aperture $2^{0.5}$. Further, in this example, the hyperbolic colour space 204, 206 comprises several hyperboloids.

In particular, the hyperbolic colour space 204, 206 of FIG. 5 comprises the unit hyperboloid 408, also noted $H_1$, thus a non-unit hyperboloid 505, of any intensity factor k, noted $H_k$. The unit hyperboloid H1 has an intensity factor k equal to 1.

The equation of the envelope of the cone 405, denoted C, in the hyperbolic metric projective reference frame (0, $\psi_1$, $\psi_2$, $\psi_3$, $\Sigma\psi$) is given by:

$$C = \{x = [x_1, x_2, x_3]^t \mid x^t J x = 0\} \qquad \text{[Math 7]}$$

With x corresponding to any point with coordinates $x_1$, $x_2$, $x_3$ in the hyperbolic metric projective reference frame defined by vectors $\psi_1$, $\psi_2$, $\psi_3$ of the canonical projective reference frame also called hyperbolic metric projective reference frame, and with the matrix J defined by:

$$J = \begin{bmatrix} -1/2 & 0 & 0 \\ 0 & -1/2 & 0 \\ 0 & 0 & 1 \end{bmatrix}. \qquad \text{[Math 8]}$$

This is again a cone 405 with matrix C(k, $\xi$) defined by:

$$C(k, \xi) = k \begin{bmatrix} \sqrt{2}\cos 2\pi\xi \\ \sqrt{2}\sin 2\pi\xi \\ 1 \end{bmatrix}. \qquad \text{[Math 9]}$$

The cone 405 defines a hyperbolic metric represented by the non-unit hyperboloid 505 denoted $H_k$. The hyperbolic metric $H_k$ is defined by the formula:

$$H_k = \{X = [x_1, x_2, x_3]^t \mid X^t J X = k^2\} \qquad \text{[Math 10]}$$

Where X corresponds to any point on the non-unit hyperboloid 505 with coordinates $x_1$, $x_2$, $x_3$ in the projective hyperbolic metric defined by vectors $\psi_1$, $\psi_2$, $\psi_3$. In this example, any point X corresponds to any colour.

The hyperboloid $H_k$ is written according to the following formula:

$$H_k(s, \xi) = k \begin{bmatrix} \sqrt{2} \sinh s \cos 2\pi\xi \\ \sqrt{2} \sinh s \sin 2\pi\xi \\ \cosh s \end{bmatrix} \qquad \text{[Math 11]}$$

With k corresponding to the intensity component, s the saturability component and $\xi$ the hue component of any colour X.

Following this example, any point X (i.e. colour) inside the cone 405 belongs to a hyperboloid with an intensity factor k given by the formula:

$$k = \sqrt{X^t JX} \qquad \text{[Math 12]}$$

This point X can be projected into the unit hyperboloid 408 in a point x. Thus, any element expressed in any hyperboloid of factor k can be projected into a unit hyperboloid $H_1$. By way of example, the point F belonging to the non-unit hyperboloid 505 $H_k$ is projected onto the unit hyperboloid 408 $H_1$ at a point f. A straight line 508 connects the origin of the hyperbolic metric projective reference frame to the point F on the non-unit hyperboloid $H_k$ 505. This straight line 508 is a projective straight line 508.

In this example, the data F and G are positioned on the same projective straight line 508. Lights F and G are therefore metameric. These lights are therefore perceived in an equivalent way by the colourimetric systems.

Since lights F and G are metameric and with the same intensity, the following relationship is verified:

$$|F\rangle \sim |G\rangle \Leftrightarrow oe(|F\rangle) = k.oe(|G\rangle) \qquad \text{[Math 13]}$$

with k equal to 1 because F and G are also of the same intensity.

As the lights are positive spectral functions, they are inscribed inside the cone 405.

In this example, the point f of light F is a pure colour. The spectral function of light F in the projective hyperbolic metric is expressed in terms of the spectral function 510. The spectral function of the light F in the hyperbolic metric projective reference frame 510 is defined according to the formula $f(\xi) = |f\rangle$ as the projected point of any point F of the metamerism space corresponding to a spectral light $F(\xi)$. It is defined as the projection onto the unit hyperboloid $H_1$, defined by the equation:

$$f = \frac{F}{\sqrt{F^T JF}} = \frac{F}{k} \qquad \text{[Math 14]}$$

Thus a proportionality factor relates data expressed in the unit hyperboloid $H_1$ to a non-unit hyperboloid $H_K$.

So with any light $|F\rangle$, is associated its representation in the unit hyperboloid 408 as the vector $F = oe(|F\rangle)$, and its representation in multiplicative luminance k and chrominance $(s, \xi)$ as:

$$F = \begin{bmatrix} F_1 \\ F_2 \\ F_3 \end{bmatrix} = k \begin{bmatrix} \sqrt{2} \sinh s \cos 2\pi\xi \\ \sqrt{2} \sinh s \sin 2\pi\xi \\ \cosh s \end{bmatrix} \qquad \text{[Math 15]}$$

With k corresponding to the intensity component, s the saturability component and $\xi$ the hue component of the colour F.

The intensity component k can be defined by:

$$k = \sqrt{F^T JF} \qquad \text{[Math 16]}$$

The saturability component s can be defined by:

$$s = \sinh^{-1} \frac{\sqrt{F_1^2 + F_2^2}}{\sqrt{2}k} \qquad \text{[Math 17]}$$

The hue component $\xi$ can be defined by:

$$\xi = \frac{1}{2\pi} \tan^{-1} \frac{F_2}{F_1} \qquad \text{[Math 18]}$$

The saturability s can define the aperture of the colour in the projective hyperbolic colour space.

Expressing the projected piece of data in the unit hyperboloid H1 allows chrominance information of said projected piece of data to be encoded.

FIG. 6A is one example of a representation of the step 208 of the method 300 of converting an initial piece of data 202 in a hyperbolic colour space of a colourimetric system.

According to this example, the spectral function of the colourimetric system from which the initial piece of data 202 comes is unknown and cannot be measured. Thus, only the initial piece of data 202 is known.

By way of non-limiting example, the initial piece of data 202 is an image comprising pixels 602 expressed in R, G, B coordinates.

According to this example, each pixel 602 of the image 202 comprises three coordinates expressed according to the formula:

$$p_\phi = \begin{bmatrix} r \\ g \\ b \end{bmatrix} \qquad \text{[Math 19]}$$

with $p_\phi$ corresponding to a pixel 602 of image 202 and $$\begin{bmatrix} r \\ g \\ b \end{bmatrix}$$

corresponding to the coordinates of pixel 602 in R, G, B space (i.e. initial reference frame).

The spectral origin of each pixel 602 is unknown.

According to this example, to perform the conversion step 208, the coordinates of the pixels 602 in R, G, B space are the same as the coordinates of the pixels 602 in the orthonormal reference frame defined by the matrix of vectors |Φ>. Thus, the coordinates of each pixel 602 in the orthonormal reference frame can be written according to the formula $$|p_\phi\rangle = r|\phi_1\rangle + g|\phi_2\rangle + b|\phi_3\rangle = |\phi\rangle p_\phi \qquad \text{[Math 20]}$$

With r, g, b corresponding to the pixel coordinates in R, G, B space, $|\Phi_1\rangle$, $|\Phi_2\rangle$, $|\Phi_3\rangle$ corresponding to the vectors of the orthonormal reference frame.

The representation of the initial piece of data 202 (image R, G, B) in the hyperbolic colour space of the colourimetric system is performed by the conversion step 208. The conversion step 208 is performed for each pixel 602 of the initial piece of data 202 according to the following formula:

$$p = Pp_\phi \qquad \text{[Math 21]}$$

with P corresponding to the Euclidean rotation matrix and p corresponding to the coordinates of a pixel 602 in the projective hyperbolic metric reference frame, $p_\phi$ corresponding to the coordinates of the pixel in the orthonormal reference frame.

Each pixel 602 of the initial piece of data 202 comprises coordinates in the hyperbolic colour space.

The conversion step is performed on all the pixels 602 (i.e. elements 602) of the initial piece of data 202.

FIG. 6B is a representation of the pixels 602 of the initial piece of data 202 illustrated in FIG. 6A in a hyperbolic colour space 204 defined from the initial piece of data 202 of unknown origin.

The intensity component k of the initial piece of data 202 corresponds to points on a projective straight line. The projective straight line can be defined by a line which passes through the origin 406 of the hyperbolic metric projective reference frame and which intersects a hyperboloid. The saturability s and hue ξ components of the initial piece of data 202 correspond to coordinates in the unit hyperboloid 408. Each pixel 602 is expressed as a point in the hyperbolic metric projective reference frame with coordinates for a saturability component, a hue component and an intensity factor k.

Thus, it is possible to construct a hyperbolic metric colour space 204 even if the spectral components of the colourimetric system from which the initial piece of data 202 is derived are unknown.

FIG. 7 is a schematic representation of a non-limiting exemplary embodiment of a method 700 according to the invention.

The method illustrated in FIG. 7 includes all of the steps of the method 300 illustrated in FIG. 3 and FIG. 4. Only the differences will be described.

In the case of FIG. 7, the spectral function of the at least one first colourimetric system and the at least one second colourimetric system are unknown. However, these spectral functions may be determined by measurements.

In this case, the method 700 comprises, prior to the step 302 of designing the hyperbolic colour space 204 of the first colourimetric system and prior to the step 304 of designing the hyperbolic colour space 206 of the second colourimetric system:

a step 702 of measuring the spectral function of the first colourimetric system, and a step 704 of measuring the spectral function of the second colourimetric system.

The step 702 of measuring and the step 302 of designing the hyperbolic colour space 204 of the first colourimetric system are included in a calibration phase 706 for defining the hyperbolic metric projective reference frame of the first colourimetric system.

The step 704 of measuring and the step 304 of designing the hyperbolic colour space 206 of the first colourimetric system are included in a calibration phase 708 for defining the hyperbolic metric projective reference frame 206 of the second colourimetric system.

In a non-limiting example, the first colourimetric system and/or the second colourimetric system may comprise an acquisition means. For example, the first colourimetric system and the second colourimetric system may be an acquisition means, such as a photographic camera or a video camera or a photon sensor. If the first colourimetric system and the second colourimetric system comprise an acquisition means, then the step of measuring 702, 704 the spectral function of the first colourimetric system and the second colourimetric system can preferably be performed by a spectrophotometer accompanied with a monochromator.

In this example, each step 702, 704 of measuring the spectral function of the means for acquiring the first colourimetric system and the second colourimetric system may comprise the following steps of:

emitting spectral light, referred to as reference light, by a monochromator, towards the means for acquiring the first colourimetric system or the second colourimetric system, comparing spectral responses recorded by the spectrophotometer and the means for acquiring the first colourimetric system or second colourimetric system.

By way of non-limiting example, in the case of acquisition means, a monochromator emits spectral light equivalent to a Dirac in the visible range. This light is then measured by a spectrophotometer and simultaneously sent into a lens of an acquisition device, for example a camera. The R, G, B values delivered by the acquisition means for each light (Dirac) sent are used to calculate spectral function of the acquisition means.

In another non-limiting example, the first colourimetric system and/or the second colourimetric system may comprise a display means. For example, the first colourimetric system and the second colourimetric system may be a display means, such as a screen. If the first colourimetric system and/or the second colourimetric system comprise a display means, then the step of measuring 702, 704 the spectral function of the first colourimetric system and the second colourimetric system can preferably be performed by a spectrophotometer.

By way of example, in the case of a display, digital values (DV) are sent to a video card to generate light on a screen. This light is then measured. The measurement of the spectral function of a screen can be carried out according to the disclosure of application WO 2020/048701 A1.

In this example, the step 702 of measuring the spectral function in the measurement reference frame (noted $|\alpha^1\rangle$ in this example) of the first colourimetric system is provided at the input of the step 302 of designing the first hyperbolic colour space 204 of the first colourimetric system. Similarly, the step 704 of measuring the spectral function (noted $|\alpha^2\rangle$ in this example) in the measurement reference frame of the second colourimetric system is provided at the input of the step 304 of designing the second hyperbolic colour space 206 of the second colourimetric system.

FIG. 8 is one exemplary embodiment of a step of designing the hyperbolic colour space 302 of a first colourimetric system from a spectral function of the first colourimetric system and a step of designing the hyperbolic colour space 304 of a second colourimetric system from a spectral function of the second colourimetric system.

FIG. 8 comprises a graph 801 comprising the spectral function 802 of the first colourimetric system expressed in the measurement reference frame and the spectral function 804 of the first colourimetric system expressed in the orthonormal reference frame.

The spectral function 802 of the first colourimetric system expressed in the measurement reference frame comprises three colour components noted $\mathbf{802}_1$, $\mathbf{802}_2$ and $\mathbf{802}_3$ respectively. The spectral function 804 of the first colourimetric system expressed in the orthonormal reference frame comprises three colour components noted $\mathbf{804}_1$, $\mathbf{804}_2$ and $\mathbf{804}_3$ respectively.

FIG. 8 includes a graph 805 comprising the spectral function 806 of the second colourimetric system expressed in the measurement reference frame and the spectral function 808 of the second colourimetric system expressed in the orthonormal reference frame.

The spectral function 806 of the second colourimetric system expressed in the measurement reference frame (i.e. matrix $|\alpha\rangle$) comprises three colour components noted $\mathbf{806}_1$, $\mathbf{806}_2$ and $\mathbf{806}_3$ respectively. The spectral function 804 of the first colourimetric system expressed in the orthonormal reference frame (i.e. matrix $|\phi\rangle$) comprises three colour components noted $\mathbf{808}_1$, $\mathbf{808}_2$ and $\mathbf{808}_3$ respectively.

By way of non-limiting example, the first colourimetric system can be an acquisition means while the second colourimetric system can be a display means.

For the first colourimetric system, the projection step 404 makes it possible to obtain the hyperbolic colour space 204 of the first colourimetric system, and for the second colourimetric system, the projection step 404 makes it possible to obtain the hyperbolic colour space 206 of the second colourimetric system.

Thus the hyperbolic metric projective reference frame associated with the first colourimetric system is defined in the same way as the hyperbolic metric projective reference frame of the second colourimetric system.

The hyperbolic colour space 204, 206 of the first colourimetric system and of the second colourimetric system each comprise a unit hyperboloid 408 and a convex cone 405.

The hyperbolic metric projective reference frame of the first colourimetric system and of the second colourimetric system comprise a common projective axis. The common projective axis corresponds to the axis defined by the unit vector $\psi_3$. Each cone 405 is centred on the common projective axis.

By way of example, a matrix $|\alpha^1\rangle$ is considered to be the spectral function of the first colourimetric system in the measurement reference frame and a matrix $|\alpha^2\rangle$ is considered to be the spectral function of the second colourimetric system in the measurement reference frame. To express data from one space to another, the hyperbolic colour space of the first colourimetric system should be able to switch over with the colour space of the second colourimetric system.

To achieve this, it is sufficient to find the spectral functions $\psi^1$, $\psi^2$, expressed in the hyperbolic metric projective reference frame of each colourimetric system to be able to perform the adaptation step 212 between the first colourimetric system and the second colourimetric system. In this example, this is possible when the hyperbolic metric projective reference frame of the first colourimetric system and the hyperbolic metric projective reference frame of the second colourimetric system comprise a common projective axis, for example the axes of the hyperbolic metric projective reference frames are similar or collinear between both representations. These functions are given by:

$$\langle \varphi^1 | = P\langle \phi^1 | = P\Gamma^1 \langle \alpha^1 | \qquad \text{[Math 22]}$$

With $\psi^1$ corresponding to the spectral function of the first colourimetric system in the hyperbolic metric projective reference frame, $\Phi^1$ corresponding to the spectral function of the first colourimetric system in the orthonormal reference frame and $\alpha^1$ corresponding to the spectral function of the first colourimetric system in the measurement reference frame P corresponding to the Euclidean rotation matrix and $\Gamma$ corresponding to the decorrelation matrix.

$$\langle \varphi^2 | = P\langle \phi^2 | = P\Gamma^2 \langle \alpha^2 | \qquad \text{[Math 23]}$$

With $\psi^2$ corresponding to the spectral function of the second colourimetric system in the hyperbolic metric projective reference frame, $\phi^2$ corresponding to the spectral function of the second colourimetric system in the orthonormal reference frame and $\alpha^2$ corresponding to the spectral function of the second colourimetric system in the measurement reference frame, P corresponding to the Euclidean rotation matrix and $\Gamma$ corresponding to the decorrelation matrix.

$$\Gamma^i, i = \{1, 2\} \qquad \text{[Math 24]}$$

With index 1 corresponding to the first colourimetric system and index 2 corresponding to the second colourimetric system, $\Gamma^{i'}$ calculated as:

$$\Gamma^{i'} = (\langle \varphi^1 | \varphi^1 \rangle)^{1/2} P \qquad \text{[Math 25]}$$

$$v = \Gamma^{i'} \begin{bmatrix} 1 \\ 1 \\ 1 \end{bmatrix} / \left\| \Gamma^{i'} \begin{bmatrix} 1 \\ 1 \\ 1 \end{bmatrix} \right\| \qquad \text{[Math 26]}$$

$$V = \left[ v_1 = \frac{\Gamma^{i'} \begin{bmatrix} 1 \\ 0 \\ 0 \end{bmatrix} \wedge v}{\left\| \Gamma^{i'} \begin{bmatrix} 1 \\ 0 \\ 0 \end{bmatrix} \wedge v \right\|} v_2 = v_1 \wedge v \right] \qquad \text{[Math 27]}$$

$$\Gamma^i = (V^t \Gamma^{i'})^{-1} \qquad \text{[Math 28]}$$

The axis of the hyperbolic metric projective reference frames $\psi^i$ associated with each apparatus is collinear with a sum of the vectors $\phi_1$, $\phi_2$, $\phi_3$.

FIG. 9 is a schematic representation of one exemplary embodiment of a method 900 according to the invention. The method 900 illustrated in FIG. 9 comprises all the steps of method 200 or 300 or 700 illustrated in FIG. 2, 3, or 7.

In this example, the initial piece of data is of known origin. Consequently, the spectral function of the colourimetric system from which the initial piece of data originates is known.

In this example, at least one of the colourimetric systems, for example the first colourimetric system, comprises a deformed white point. For example, when the straight line between the black point and the white point (coordinate 1 along $\Psi_3$) is not collinear with a direction of projection. This means that the hyperbolic colour space of at least one of the colourimetric systems involved in the method (here, for example, the first colourimetric system), is not aligned with the white of the model of the ideal observer based on the canonical reference frame for which the spectral function $\psi3$ ($\xi$)=1. In this case, the method according to the invention can correct this error by performing correction. The correction is carried out by a step of correcting the defective hyperbolic colour space by using a hyperbolic rotation matrix noted Q.

By way of non-limiting example, the white point of the hyperbolic projective reference frame of the first colourimetric system is defective. The conversion step 208 then comprises a step 902 of correcting the hyperbolic colour space 204 of the first colourimetric system. In this example, the correction step 902 is performed before the adaptation step 212. The correction step 902 provides the hyperbolic rotation matrix.

Let $$W^i = \langle \psi | \psi_3^i \rangle,$$

be the "colour" of the white of system i in hyperbolic colour space. The vector $W^i$ has the coordinate $[W_1^i\ W_2^i\ W_3^i]$ in the other hyperbolic colour space. Thus, the hyperbolic rotation matrix $\Omega$, also known as the white balance matrix, can be defined by:

$$\Omega = R^T S R \qquad \text{[Math 29]}$$

$$R = \begin{bmatrix} \cos(2\pi\Delta\xi) & -\sin(2\pi\Delta\xi) & 0 \\ \sin(2\pi\Delta\xi) & \cos(2\pi\Delta\xi) & 0 \\ 0 & 0 & 1 \end{bmatrix} \qquad \text{[Math 30]}$$

$$S = \begin{bmatrix} \cosh(\Delta s) & 0 & \sqrt{2}\sinh(\Delta s) \\ 0 & 1 & 0 \\ \frac{1}{\sqrt{2}}\sinh(\Delta s) & 0 & \cosh(\Delta s) \end{bmatrix} \qquad \text{[Math 31]}$$

$$\Delta\xi = -\frac{1}{2\pi}\tan^{-1}\frac{W_2^i}{W_1^i} \qquad \text{[Math 32]}$$

$$\Delta s = -\sinh^{-1}\frac{\left((W_1^i)^2 + (W_2^i)^2\right)^{\frac{1}{2}}}{\sqrt{2}} \qquad \text{[Math 33]}$$

With the exponent i corresponding to the colourimetric system considered, and the index 1 or 2 corresponding to the coordinate of the vector carried by $|\psi_3\rangle$ in the hyperbolic colour space of the other colourimetric system (i.e. different from the system i considered), for example here in the second hyperbolic colour space.

In one alternative not illustrated, the white point of the second colourimetric system may be defective. In this case, the adaptation step 212 may comprise a step of correcting the hyperbolic colour space 206 of the second colourimetric system.

Thus, it is possible to correct the hyperbolic colour spaces of the colourimetric systems when the white point is deformed.

FIG. 10 is a schematic representation of one exemplary embodiment of a method 1000 according to the invention. The method 1000 illustrated in FIG. 10 comprises all the steps of the method 200 or 300 or 700 illustrated in FIG. 2, 3, or 7.

In this example, the initial piece of data 202 is of unknown origin. Consequently, the spectral function of the colourimetric system from which the initial piece of data originates is unknown. Furthermore, at least one of the colourimetric systems comprises a deformed white point. The coordinates of the white point are unknown.

The method 1000 illustrated in FIG. 10 may comprise a preliminary phase comprising a step of measuring a white point in the initial piece of data 202 or determining a white point of the first colourimetric system and/or of the second colourimetric system. The preliminary phase may be carried out before the adaptation step 212 and/or after the adaptation step 212.

If the first colourimetric system and/or the second colourimetric system comprises an acquisition means, then the white point may be determined by presenting a diffuse white in front of the first colourimetric system and/or the second colourimetric system.

In one alternative, the white point of the white point measurement step can be determined directly from the initial piece of data, for example by locating a white object on the initial piece of data. The pixel corresponding to the white object selected will correspond to the white point.

By way of example, the coordinates of the white point in R, G, B coordinates obtained by one of the methods described above and converted into the hyperbolic colour space of the second colourimetric system and/or the first colourimetric system, are noted:

$$W_\alpha = \begin{bmatrix} r \\ g \\ b \end{bmatrix} \qquad \text{[Math 34]}$$

with the index a referring to the measurement reference frame, $[r\ g\ b]^T$ corresponding to the values R, G, B of the white point in the measurement reference frame of the colourimetric system considered, W corresponding to the coordinates R, G, B of the white point measured in the measurement reference frame of the colourimetric system considered.

From the coordinates of the white point in the measurement reference frame of the colourimetric system considered, the coordinates of the white point in a hyperbolic metric projective reference frame are given by the following relationship:

$$W^i = PW_\alpha \qquad \text{[Math 35]}$$

Where the exponent i corresponds to the colourimetric system considered, P is the Euclidean rotation matrix used to express the coordinates of the white point in the hyperbolic metric projective reference frame of the system considered.

In this example and in a non-limiting manner, the second colourimetric system may comprise a deformed white point. The method 1000 may thus comprise a preliminary phase 1002 comprising a step 1004 of measuring a white point from the second colourimetric system. This step may be performed before the adaptation step 212. The preliminary phase 1002 can thus provide the second colour space 206 as well as the coordinates of the white point $W^i$ in the hyperbolic metric projective reference frame of the second colourimetric system. In this example, the adaptation step comprises the correction step 902 as defined in FIG. 9. The coordinates of the white point $W^i$ in the hyperbolic colour space of the second colourimetric system are used to calculate the hyperbolic rotation matrix Ω according to the formula Math 29. In this example, the hyperbolic rotation matrix Ω is used in the transfer function of the adaptation step 212. Thus, in this example, the transfer function used in the adaptation step 212 comprises a hyperbolic rotation matrix Q.

By way of example, for a hyperbolic rotation matrix between a camera and a screen, correspondence between both systems can be seen from the point of view of the ideal observer and its associated hyperbolic colourimetric model. The correspondence can be calculated as a change of reference frame from one of the systems to a hyperbolic model of the ideal observer, followed by a change of reference frame to the other system.

FIG. 11 is a schematic representation of several iterations of the method 200, or 300 or 700.

Only the differences relative to the methods illustrated in FIGS. 2, 3 and 7 will be described.

In this example, several initial data 202a, 202b, 202c are illustrated. The initial data may be encoded identically or differently. In this example, all the initial data 202a, 202b, 202c are images in R, G, B format.

The method 200, or 300, or 700 is iterated for each initial piece of data 202. There are as many iterations of the method 200, or 300, or 700 as there are initial data 202.

In this example, three initial data 202 are illustrated. In a non-limiting way, the method 200, or 300, or 700 is iterated three times, noted $n_a$, $n_c$ and $n_c$. By way of non-limiting example, the initial data are comprised of several elements 602 (i.e. several pixels). Consequently, in each iteration of the method 200, or 300, or 700, the conversion 208 and adaptation 212 steps are iterated for each element 602 of the initial piece of data 202.

In a non-limiting way, the projected piece of data 210 of the initial piece of data 202 is sent to several colourimetric systems called second colourimetric systems.

At each iteration $n_a$, $n_b$ and $n_c$ of the method 200, 300 or 700, the initial piece of data 202 is projected into a projected piece of data 210. The projected piece of data 210 is then transformed into several adapted data 214. In this example, the projected piece of data 210 is transformed into three adapted data, 214₁, 214₂ and 214₃. There are as many adapted data 214 as there are second colourimetric systems. Thus, for each iteration of the method 200, or 300, or 700, the method provides three adapted data 214. Adapted piece of data numbered 214₁ corresponds to adapted piece of data 214 sent to a second colourimetric system comprising a hyperbolic colour space noted 206₁. Adapted data numbered 214₂ corresponds to adapted piece of data 214 sent to a second colourimetric system comprising a hyperbolic colour space noted 206₂. Adapted piece of data numbered 214₃ corresponds to adapted piece of data 214 sent to a second colourimetric system comprising a hyperbolic colour space noted 206₃.

By way of non-limiting example, the second colourimetric systems are screens. Thus, method 1100 illustrates sending multiple images encoded in R, G, B space to several screens comprising a hyperbolic colour space.

FIG. 12 is a schematic representation of a first example of a device 1200 according to the invention.

The device 1200 is, for example, a calculator unit 1200. The device 1200 may be included in a computer.

The device 1200 arranged to implement the method 200 or 900 comprises:
- a conversion module 1202 configured to convert the initial piece of data 202 into a projected piece of data 210 by expressing all the elements 602 of the initial piece of data 202 in the colour space of the first colourimetric system, and
- an adaptation module 1204 configured to adapt the projected piece of data 210 into the adapted piece of data 214 by expressing all the elements 602 in the hyperbolic colour space of the second colourimetric system by using the transfer function relating the colour spaces of the first colourimetric system and of the second colourimetric system.

The device 1200 is arranged to implement one or more iterations of the method 200.

The conversion module 1202 may comprise a reference frame change module 1206 for implementing the reference frame change step of the conversion step 208.

The device 1200 may optionally comprise a correction module 1208 configured to correct the hyperbolic colour space of the first colourimetric system and/or the second colourimetric system by using the hyperbolic rotation matrix Q. The correction module is configured and/or programmed to implement the correction step 902.

FIG. 13 is a schematic representation of a second example of a device 1300 according to the invention. The device 1300 comprises all the elements of the device 1200.

The device 1300 is, for example, a calculator unit 1300. The device 1300 may be included in a computer.

The device 1300 is arranged to implement the method 200 or 300 or 700 or 900 or 1000 and further comprises a design module 1302 configured to design the hyperbolic colour space 204 of the first colourimetric system from the spectral function $|\alpha^1>$ of the first colourimetric system, a design module 1304 configured to design the hyperbolic colour space 206 of the second colourimetric system from the spectral function $|\alpha^2>$ of the second colourimetric system.

In one alternative not illustrated, a single design module is used to design the hyperbolic colour spaces of all the colourimetric systems involved in the method according to the invention. In another alternative not illustrated, the device 1300 may comprise as many design modules as there are colourimetric systems involved in the method according to the invention. Consequently, each design module may be associated with a colourimetric system.

By way of non-limiting example, each design module may be included in a calibration module configured to implement the calibration steps 706, 708.

FIG. 14 is a schematic representation of one example of equipment 1400 according to the invention. The equipment 1400 comprises the device 1200 or 1300 illustrated in FIG. 12 or 13.

The equipment 1400 comprises, by way of non-limiting example, a first colourimetric system 1402. The first colourimetric system 1402 is an acquisition means 1402 arranged to acquire at least one image. In this example, the at least one image acquired by the acquisition means 1402 is associated with the at least one initial piece of data 202. The acquisition means comprises a hyperbolic colour space, referred to as first hyperbolic colour space noted 204.

The equipment 1400 comprises, in this example, a second colourimetric system 1404. The second colourimetric system 1404 is a display means 1404, arranged to display the image acquired by the acquisition means. The image displayed by the display means is associated with the adapted piece of data 214. The display means comprises a hyperbolic colour space, referred to as second hyperbolic colour space noted 206.

The first colour space 204 and the second colour space 206 may be known or designed and/or measured as described in FIGS. 3, 4, 5, 7, 8, 9, 10.

FIG. 15 is a schematic representation of one example of equipment 1500 according to the invention. The equipment 1500 comprises the device 1200 or 1300 illustrated in FIG. 12 or 13.

Only the differences with the equipment 1400 will be described. In this example, the equipment 1500 comprises several second colourimetric systems noted 1404₁, 1404₂, 1404₃. By way of non-limiting example, the second colourimetric systems 1404 are display means 1404. Each second colourimetric system 1404 comprises its own hyperbolic colour space 206. Each second colour space 206 may be known or designed and/or measured as described in FIGS. 3, 4, 5, 7, 8, 9, 10. The projected piece of data 210 is adapted to the hyperbolic colour spaces of each second colourimetric system 1404₁, 1404₂, 1404₃. Thus, the device 1200 or 1300 provides an adapted piece of data 214 for each second colourimetric system 1404. In the present example, the adapted piece of data 214₁ is provided to the second colourimetric system 1404₁. Adapted data 214₂ is provided to the second colourimetric system 1404₂. Adapted data 214₃ is provided to the second colourimetric system 1404₃. Each adapted piece of data 214 depends on the spectral characteristics of the second colourimetric system on which it will be displayed.

In this example, each display means is arranged to display the adapted image 214 associated therewith.

Of course, the invention is not limited to the examples just described. Numerous modifications can be made to these examples without departing from the scope of the invention as described.

The invention claimed is:

1. A method for converting an initial piece of data, between a color space of a first colorimetric system, and a color space of a second colorimetric system, the initial piece of data consisting of at least one element expressed in an initial reference frame, the method being implemented in an equipment comprising a calculator unit, the first colorimetric system comprising at least one of a video camera, a photographic camera, and a first screen, the second colorimetric system comprising a second screen, said second colorimetric system being different from the first colorimetric system, said method comprising:

measuring a white point in the initial piece of data, wherein the white point is defined by a sum of three base vectors and at least one of the first colorimetric system and the second colorimetric system comprises a deformed white point;

converting the initial piece of data into a projected piece of data, by expressing the at least one element in the color space of at least one of the first colorimetric system and the second colorimetric system, adapting the projected piece of data into an adapted piece of data, by expressing the at least one element in the color space of at least one of the first colorimetric system and the color space of the second colorimetric system using a transfer function relating the color space of the first colorimetric system to the color space of the second colorimetric system, a color space of the adapted piece of data being different from the color space of the projected piece of data, wherein the color space of the first colorimetric system and the color space of the second colorimetric system are each hyperbolic color spaces defined by a hyperbolic metric projective reference frame; and correcting at least one of the hyperbolic color spaces of the first colorimetric system and the second colorimetric system by using a hyperbolic rotation matrix Q that corrects the deformed white point.

2. The method according to claim 1, further comprising:

changing a reference frame from the initial reference frame to a hyperbolic metric projective reference frame using at least one mathematical operator to express the at least one element of the initial piece of data in the color space of at least one of the first colorimetric system and the color space of the second colorimetric system.

3. The method according to claim 2, wherein the at least one mathematical operator comprises at least one of:

a decorrelation matrix $\Gamma$, and a Euclidean rotation matrix P.

4. The method according to claim 1, wherein the hyperbolic metric projective reference frame of at least one of the first colorimetric system and of the second colorimetric system comprises a common projective axis.

5. The method according to claim 4, wherein the hyperbolic color space comprises a convex cone oriented along the common projective axis with an aperture $2^{0.5}$.

6. The method according to claim 1, wherein the hyperbolic metric projective reference frame of at least one of the first colorimetric system and the second colorimetric system is constructed in an $R^4$ base.

7. The method according to claim 1, wherein each hyperbolic metric projective reference frame is defined by:

the white point and a black point defining the origin of the hyperbolic metric projective reference frame.

8. The method according to claim 7, wherein at least one of the vectors of the hyperbolic metric projective reference frame of at least one of the first colorimetric system and the second colorimetric system is a unit vector.

9. The method according to claim 1, wherein each hyperbolic color space comprises a unit hyperboloid, and at least one of the projected piece of data and the adapted piece of data comprise at least one component expressed in the unit hyperboloid.

10. The method according to claim 1, wherein the transfer function comprises an identity matrix.

11. The method according to claim 1, further comprising, prior to the conversion step, designing the hyperbolic color space of the first colorimetric system from a spectral function of the first colorimetric system; and, designing the hyperbolic color space of the second colorimetric system from a spectral function of the second colorimetric system.

12. The method according to claim 11, further comprising:

projecting the spectral function of at least one of the first colorimetric system and the second colorimetric system into an orthonormal reference frame, and projecting said spectral function of at least one of the first colorimetric system and the second colorimetric system expressed in the orthonormal reference frame into a hyperbolic metric projective reference frame.

13. The method according to claim 1, further comprising:
measuring a spectral function by using at least one of a spectrophotometer and a monochromator.

14. The method according to claim 13, further comprising:
measuring the spectral function using the spectrophotometer.

15. The method according to claim 1, wherein the initial piece of data is an image and the at least one element is a pixel of the image.

16. The method according to claim 1, wherein the initial piece of data comes from at least one of the first colorimetric system and the second colorimetric system.

17. The method according to claim 1, wherein the projected piece of data is an image.

18. The method according to claim 1, wherein the projected piece of data comprises three components:
an intensity component k
a saturability component s, and
a hue component $\xi$.

19. The method according to claim 1, wherein the adapted piece of data comprises three components:
an intensity component k',
a saturability component s', and
a hue component $\xi'$.

20. A computing device comprising means configured to implement a method for converting an initial piece of data, between a color space of a first colorimetric system, and a color space of a second colorimetric system, the initial piece of data consisting of at least one element expressed in an initial reference frame, the method being implemented in an equipment comprising a calculator unit, the first colorimetric system comprising at least one of a video camera, a photographic camera, and a first screen, the second colorimetric system comprising a second screen, said second colorimetric system being different from the first colorimetric system, said method comprising:
measuring a white point in the initial piece of data, wherein the white point is defined by a sum of three base vectors and at least one of the first colorimetric system and the second colorimetric system comprises a deformed white point;
converting the initial piece of data into a projected piece of data, by expressing the at least one element in the color space of at least one of the first colorimetric system and the second colorimetric system,
adapting the projected piece of data into an adapted piece of data, by expressing the at least one element in the color space of at least one of the first colorimetric system and the color space of the second colorimetric system using a transfer function relating the color space of the first colorimetric system to the color space of the second colorimetric system, a color space of the adapted piece of data being different from the color space of the projected piece of data, wherein the color space of the first colorimetric system and the color space of the second colorimetric system are each hyperbolic color spaces defined by a hyperbolic metric projective reference frame; and
correcting at least one of the hyperbolic color spaces of the first colorimetric system and the second colorimetric system by using a hyperbolic rotation matrix Q that corrects the deformed white point.

21. An equipment comprising:
a calculator configured to perform a method for converting an initial piece of data, between a color space of a first colorimetric system, and a color space of a second colorimetric system, the initial piece of data consisting of at least one element expressed in an initial reference frame, the method being implemented in an equipment comprising a calculator unit, the first colorimetric system comprising at least one of a video camera, a photographic camera, and a first screen, the second colorimetric system comprising a second screen, said second colorimetric system being different from the first colorimetric system, said method comprising:
measuring a white point in the initial piece of data, wherein the white point is defined by a sum of three base vectors and at least one of the first colorimetric system and the second colorimetric system comprises a deformed white point;
converting the initial piece of data into a projected piece of data, by expressing the at least one element in the color space of at least one of the first colorimetric system and the second colorimetric system,
adapting the projected piece of data into an adapted piece of data, by expressing the at least one element in the color space of at least one of the first colorimetric system and the color space of the second colorimetric system using a transfer function relating the color space of the first colorimetric system to the color space of the second colorimetric system, a color space of the adapted piece of data being different from the color space of the projected piece of data, wherein the color space of the first colorimetric system and the color space of the second colorimetric system are each hyperbolic color spaces defined by a hyperbolic metric projective reference frame; and
correcting at least one of the hyperbolic color spaces of the first colorimetric system and the second colorimetric system by using a hyperbolic rotation matrix Q that corrects the deformed white point.

* * * * *